US005769931A

United States Patent [19]
Wang et al.

[11] Patent Number: 5,769,931
[45] Date of Patent: Jun. 23, 1998

[54] INK COMPOSITION

[75] Inventors: Aiying Wang; Barry W. Chadwick, both of Simpsonville, S.C.

[73] Assignee: BIC Corporation, Milford, Conn.

[21] Appl. No.: 684,904

[22] Filed: Jul. 25, 1996

[51] Int. Cl.[6] .................................................. C09D 11/00
[52] U.S. Cl. ................. 106/31.38; 106/31.7; 106/31.58; 106/31.86
[58] Field of Search ............................... 106/31.38, 31.7, 106/31.36, 31.68, 31.58, 31.86

[56] References Cited

U.S. PATENT DOCUMENTS

| | | |
|---|---|---|
| 4,137,083 | 1/1979 | Hedrick . |
| 4,261,749 | 4/1981 | Johnson . |
| 4,471,079 | 9/1984 | Enami . |
| 4,509,982 | 4/1985 | Iijima . |
| 4,545,818 | 10/1985 | Inoue et al. . |
| 4,551,490 | 11/1985 | Doyle et al. . |
| 4,585,815 | 4/1986 | Ono et al. . |
| 4,629,748 | 12/1986 | Miyajima et al. . |
| 4,671,691 | 6/1987 | Case et al. . |
| 4,686,246 | 8/1987 | Gajria . |
| 4,693,846 | 9/1987 | Piccirilli et al. . |
| 4,726,845 | 2/1988 | Thompson et al. . |
| 4,738,725 | 4/1988 | Daugherty et al. . |
| 4,770,706 | 9/1988 | Pietsch . |
| 4,786,198 | 11/1988 | Zgambo . |
| 4,789,399 | 12/1988 | Williams et al. . |
| 4,791,165 | 12/1988 | Bearss et al. . |
| 4,940,628 | 7/1990 | Lin et al. . |
| 4,942,185 | 7/1990 | Inoue et al. . |
| 4,971,628 | 11/1990 | Loftin . |
| 5,004,763 | 4/1991 | Imagawa . |
| 5,008,108 | 4/1991 | Rha et al. . |
| 5,009,536 | 4/1991 | Inoue et al. . |
| 5,010,125 | 4/1991 | Kruse et al. . |
| 5,013,361 | 5/1991 | Case et al. . |
| 5,024,700 | 6/1991 | Britton, Jr. . |
| 5,048,992 | 9/1991 | Loftin . |
| 5,106,881 | 4/1992 | Inoue et al. . |
| 5,120,359 | 6/1992 | Uzukawa et al. . |
| 5,203,913 | 4/1993 | Yamamoto et al. . |
| 5,217,255 | 6/1993 | Lin et al. . |
| 5,314,531 | 5/1994 | Huber et al. . |
| 5,336,307 | 8/1994 | Horvat et al. . |
| 5,338,775 | 8/1994 | Matz et al. . |
| 5,348,989 | 9/1994 | Shiraishi . |
| 5,362,312 | 11/1994 | Skaggs et al. ........................... 106/189 |
| 5,466,281 | 11/1995 | Hanke et al. . |
| 5,466,283 | 11/1995 | Kondo et al. . |
| 5,474,603 | 12/1995 | Miyashita et al. . |
| 5,476,540 | 12/1995 | Shields et al. . |
| 5,521,233 | 5/1996 | Shifrin . |
| 5,561,175 | 10/1996 | Imagawa . |

FOREIGN PATENT DOCUMENTS

| | | |
|---|---|---|
| 0248651 | 12/1987 | European Pat. Off. . |
| 0685538 | 12/1995 | European Pat. Off. . |

*Primary Examiner*—Deborah Jones
*Attorney, Agent, or Firm*—Abelman, Frayne & Schwab

[57] ABSTRACT

Novel, improved ink compositions are aqueous-based, shock-resistant, shear-thinning inks for writing instruments having a shear index greater than 0.6. The inks are a substantially uniform dispersion including colorant(s), a water dispersible, polymeric shear-thinning material selected from the group consisting of welan gum, rhamsan gum and combinations thereof, and a substantially water-soluble polymeric viscosity modifier in a polar solvent system. While the ink compositions have a high viscosity at low shear rates, they undergo shear-thinning and are readily flowable in response to shear rates produced in writing to provide a writing ink having an especially desirable combination of performance characteristics.

20 Claims, No Drawings

INK COMPOSITION

BACKGROUND

1. Technical Field

This disclosure relates to novel, improved ink compositions and to writing instruments including such ink compositions. More precisely, described herein are aqueous ink compositions including water dispersible, polymeric shear-thinning providing materials and writing instruments including the ink compositions.

2. Description of the Related Art

Ink compositions including water dispersible, polymeric, shear-thinning providing materials are thickened liquids at rest. Being non-Newtonian liquids, such inks 3exhibit shear-thinning flow behavior or shear-thinning flow characteristics in use. In other words, they become thin, readily flowable liquids at shear rates produced in writing such as with a ball-point pen. The ink compositions include a water dispersible, polymeric shear-thinning providing material dispersed in a polar solvent system. Other materials such as coloring materials, surfactants, preservatives, corrosion inhibitors, humectants and the like can also be included in the inks. Such inks have been disclosed, for example, in U.S. Pat. Nos. 4,671,691 and 5,048,992, the disclosures of which are incorporated herein by this reference.

A common material used to provide shear-thinning characteristics to the inks is xantham gum. However, xanthum gum is not stable to high temperatures such as those that might be encountered during processing, storage or transport of the inks or pens containing the inks.

It would be desirable to provide aqueous ink compositions that exhibit shear-thinning flow characteristics and that are stable at the relatively high temperatures to which the ink might be exposed; e.g., during processing, storage, transport or by the user.

SUMMARY

The novel, improved ink compositions described herein are aqueous-based, shock-resistant, shear-thinning inks for writing instruments. The ink compositions exhibit non-Newtonian Flow characteristics and have a shear index greater than 0.6. The inks comprise a substantially uniform dispersion of colorant(s), a water dispersible, polymeric shear-thinning material selected from the group consisting of welan gum, rhamsan gum and combinations thereof, and a substantially water-soluble polymeric viscosity modifier in a polar solvent system. While the ink compositions have a high viscosity at low shear rates, they undergo shear-thinning and are readily flowable in response to shear rates produced in writing to provide a writing ink having an especially desirable combination of performance characteristics.

In the writing instruments of the invention, the ink compositions are contained in hollow, non-pressurized or pressurized tubes or reservoirs, and the ink is fed directly to the writing ball of a ball-point pen. The ink can be used in combination with a follower composition to help insure a smooth, continuous flow of ink to the ball as the ink supply is consumed.

DETAILED DESCRIPTION OF PREFERRED EMBODIMENTS

The present ink compositions include particular gums that are stable to high temperatures (e.g., greater than 100° C.), a water soluble polymeric viscosity modifier, a polar solvent system and a colorant. Other conventional ingredients (e.g., biocides, anti-corrosives, sequestrants, surfactants, etc.) can also be included in the present ink compositions.

The ink compositions have a shear index of 0.6 or greater. The shear-thinning index (n) is calculated by fitting shear stress ($\tau$) and shear rate values ($\gamma$) obtained from Theological measurements on a viscometer to the empirical power law equation $\tau = K\gamma^n$ (where K and n are calculated constants). Additionally, the shear-thinning index is obtained by measurements of an aqueous solution of the shear-thinning material at shear rates between about 0 to about 500 sect$^{-1}$.

The present ink compositions preferably have the following Theological profile:

| Shear Rate (sec$^{-1}$) | Viscosity (cps) |
| --- | --- |
| 0.01 | Less than about 10,000 |
| 0.1 | Less than about 6,000 |
| 1.0 | Less than about 2,000 |
| 30 | Less than about 200 |
| 2,000 | Less than about 50 |

| Shear Rate (sec$^{-1}$) | Viscosity (cps) |
| --- | --- |
| 0.01 | Less than about 5,000 |
| 0.1 | Less than about 3,000 |
| 1.0 | Less than about 2,000 |
| 30 | Less than about 200 |
| 2,000 | Less than about 100 |

All viscosities reported herein were measured using a Haake RS 100 with controlled stress mode using steady stress programs.

The aqueous ink compositions described herein contain welan gum or rhamsan gum or a combination thereof to provide shear-thinning flow characteristics to the ink.

Welan gum is the generic name for polysaccharide S-130, a microbial polysaccharide. Welan gum is commercially available, for example, under the designations Welan K1A96 and Welan Ex 7389 from Kelco Co., San Diego, Calif.

Rhamsan gum is a heteropolysaccharide resin composed of glucuronic acid, glucose and rhamose and is a fermentate of an alcaligenad microorganism. Rhamsan gum is commercially available, for example, under the designation K1A112 from Kelco Co., San Diego, Calif.

Welan and rhamsam gums will maintain the viscosity of the ink compositions to temperatures greater than 100° C. Such temperature stability is unachievable in conventional shear-thinning inks made using xanthum gum. The amount of welan and/or rhamsan gums present in the ink compositions will vary depending on a number of factors including the colorant employed and the nature of the polymeric viscosity modifier used. Normally, however, the welan and/or rhamsan gum will be present in an amount from about 0.1 to about 1.0 percent by weight of the entire composition, preferably about 0.1 to 0.3 weight percent.

The present ink compositions also include a viscosity modifier. The viscosity modifier is a substantially water soluble polymeric material that increases the high shear viscosity of the ink. Suitable viscosity modifiers include alginates (e.g., Kelgin MV from Kelco Co.), alkylene oxide polymers and copolymers (e.g., Polyox N-10 from Union Carbide) and polyvinylpyrrolidone (e.g., PVP K-90 from GAF Corp). Combinations of the foregoing can also be used.

The viscosity modifier is present in the ink composition in an amount from about 0.1 to about 10 weight percent based on the weight of the entire composition. Preferably, from about 0.1 to about 1.0 weight percent of the viscosity modifier is employed.

The present ink compositions are based upon the use of a solvent system containing polar, non-aqueous liquids and water. Water can be used at levels of less than 50% of the solvent system. Suitable non-aqueous liquids include: (1) mono, di, tri, and higher alcohols (2) glycol ethers, (3) glycol ether acetates, and (4) glycol acetates. For a dye based ink, the solvent system constitutes from about 40 to about 90 weight percent of the ink, preferably from about 50 to about 75 weight percent of the ink.

Non-limiting examples of alcohols suitable for use in the solvent system are hexylene glycol, octylene glycol, 1,4 butanediol, thiodiglycol, 2,3-butyulene glycol, triethylene glycol, diethylene glycol, ethylene glycol, propylene glycol, glycerin, trimethylolethane, trimethylopropane, diglycerin, isopropyl alcohol, and sorbitol.

Non-limiting examples of glycol ethers suitable for use in the solvent system are ethylene glycol monoethylether, ethylene glycol monobutylether, diethylene glycolmonoisopropylether, propyleneglycolmonomethylether, diethyleneglycol, monomethylether, propylene glycol phenylether, ethylene glycol diethyl ether, and propylene glycol phenyl ether.

Non-limiting examples of glycol ether acetates suitable for use in the solvent system are propylene glycol monon-ethylether acetate; ethylene glycol monomethylether acetate, ethylene glycol monophenylether acetate, diethylene glycol monomethylether acetate, diethyulene glycol monoethylether acetate, diethylene glycol monobutylether acetate, diethylene, glycol monophenylether acetate, diethylene glycol monoisopropylether acetate, ethylene glycol diethylether acetate, diethylene glycol dimethylether acetate, and propylene glycol monomethyl ether acetate.

Non-limiting examples of glycol acetates suitable for use in the solvent system are ethylene glycol monoacetate ethylene glycol diacetate, and diethylene glycol diacetate.

The colorants to be used in the present ink compositions can be any of the water-soluble or dispersible dyes or pigments or mixtures thereof known to be useful in writing inks. From about 2 to 10%, and, preferably from about 4 to 6% by weight of a dye and/or from about 12 to 35%, preferably from about 18 to 22%, of a pigment dispersion is added to the ink formulation to obtain the desired color. Suitable colorants are available under the designation Bayer Special Black HF from Bayer, Pittsburgh, Pa., Violet 204-2 from Miliken Chemicals and Blue 204-3 from Miliken Chemicals.

Sequestrants may be added for stabilizing components of the ink, e.g., the gum component. A sequestrant binds multivalent cations in the solution, enhancing solubility and stability of the gum. Suitable agents for this purpose are sodium salts of EDTA, such as tetrasodium EDTA or Versene 220 of Dow Chemical, trisodium phosphate, sodium hexametaphosphate, or sodium glucoheptanate. These sequestrants are normally added in the amount of 1–5 parts by weight of the gum.

Many ink components are subject to degradation by microorganisms such as bacteria, yeast, and mold. Such degradation is prevented by the addition of a biocide. Suitable biocides are known to those skilled in the art and include Methyl Parasept and Ethyl Parasept available from Bayer and Kathon PFM available from Rohm & Haas.

Combinations of these materials may also be used. Generally from 0.10 to 0.20%, preferably about 0.10% to about 0.5% of bacteriocide (which may contain some water) is added to the ink formulation to control the growth of microorganisms.

These inks containing water and polar non-aqueous liquids such as glycol can be corrosive to metals used in the roller ball and socket of pens. This corrosivity can be controlled or eliminated by the addition of a corrosion inhibitor, for example benzotriazole, tolytriazole, dicyclohexyl ammonium nitrate, and organic phosphate esters. Cobratec 99 available from PMC Specialties. Generally from about 0.10 to 1.0%, preferably from 0.13 to 0.20% by weight of a corrosion inhibitor is added to the ink formulation to prevent corrosion of the tip by the ink.

To ensure that the ink be capable of wetting the metal used in the tip of the pen to provide an acceptable delivery rate of ink to the writing surface, wetting agents or lubricants can be added to the inks described herein. Suitable wetting agents include, but are not limited to, surfactants such as sodium lauryl sulfate and fluorinated alkyl esters. Suitable surfactants are available, for example, under the designation Ethomeen C-15 from Akzo, Dobbs Ferry, N.Y.; Lubriphos LB 400 from Rhone Poulenc, Inc.; and Atlas G-711 from ICI Ame. Inc. One skilled in the art will appreciate that selection of the appropriate wetting agent should be based upon actual writing tests in the type of pen having the type of writing tip in which the ink is to be used. In general, however, in a dye or pigment based ink the amount of wetting agent is from about 0.10 to 1.0%, preferably 0.14 to 0.16% by weight.

The present inks can also contain a water soluble additive to improve the water-fastness of the ink. For example, an acrylic resin that is alkaline soluble will, upon drying, bind the colorant in the written script and therefore provide a water-fast script. The acrylic resin binder can also improve the rewettability of the residue on the pen tip and therefore greatly prolong capoff time and starting ease of the ink in the pen. A suitable amine-modified acrylic copolymer is available under the designation G-Cryl 5006 from Henkel Corp.

The pH of the finished ink is preferably higher than 5.0, and generally ammonia or an amine such as triethanolamine, morpholine, diethanolamine, ethylamine, or monoethylamine is added to the formulation to obtain the desired pH value. Generally, in a dye or pigment-based ink the amount of pH control agent added is from about 0.05 to 0.50%, preferably from about 0.09 to 0.11% by weight.

The ink compositions of this disclosure are easily prepared by combining the desired ingredients in a blender or mixing with a propeller stirrer until homogeneity is achieved. Preferably the polymeric shear-thinning providing material is first added to distilled water and this combination mixed for about two hours. The other ingredients, if present, are added in the following order: other polar solvents, sequestering agents, preservatives, surfactants, corrosion inhibitors, and dyes and/or pigments. In some cases, it is advisable to pre-wet the shear-thinning providing material with a material such as ethylene glycol, propylene glycol or glycerol.

Table 1 below shows the percent ranges of ink components based upon total weight of the ink.

TABLE 1

| INGREDIENT | RANGE OF CONCENTRATION |
|---|---|
| Welan or Ramsan Gum | 0.1–0.3% |
| Viscosity Modifier (e.g. Sodium Alginate) | 0.1–0.3% |
| Acrylic Resin | 1–10% |
| Organic Amine | 0.5–6% |
| Surfactant | 0.2–1.0% |
| Sequestering Agent | 0.1–0.5% |
| Anticorrosive Agent | 0.1–0.5% |
| Biocide | 0.1–0.5% |
| Smoothness Additive | 0.5–1.0% |
| Colorant (pure color) | 2–10% |
| Non-Aqueous Polar Solvent, (e.g., Glycol) | 20–60% |
| Water | 20–90% (inc. $H_2O$ in other components) |
| Total $H_2O$ Content % | 20–90% |
| $H_2O$ % in Total Solvents | 30–80% |
| Other (Solids) % | 15–20% |

EXAMPLES

The following examples are presented to illustrate specific embodiments of the present compositions. These examples should not be interpreted as limitations upon the scope of the invention.

Example 1

As specific ink composition is prepared having the formulation given below. Ranges for each ingredient are also listed.

| COMPOUND | % WT | % RANGE |
|---|---|---|
| Water | 34.00 | 10–40% |
| Benzyl Alcohol | 2.05 | 0–5% |
| G-CRYL 5006 | 4.00 | 0–8% |
| Triethanol Amine | 4.73 | Adjust PH 7.0–8.5 |
| Whelan Gum - K1A96 | 0.20 | 0.1–0.3% |
| Na Alginate-Kelgin MV | 0.10 | 0.1–0.5% |
| Ethylene Glycol | 19.27 | 15–40% |
| Glycerine | 4.00 | 3–10% |
| Lubriphos LB400 | 0.70 | 0.3–0.0% |
| Versene 220 | 0.25 | 0.2–0.5% |
| Corbratec 99 | 0.20 | 0.1–0.5% |
| Methyl Parasept | 0.05 | 0.05–0.10% |
| Ethyl Parasept | 0.07 | 0.05–0.10% |
| $KH_2PO_4$ | 0.50 | 0.1–1.0% |
| Violet 204-2 | 22.28 | 20–30% |
| Blue 204-3 | 7.60 | 5–15% |

Examples 2–5

The following Table II provides ink formulations in accordance with this disclosure:

TABLE II

| | Ex. 2 | Ex. 3 | Ex. 4 | Ex. 5 |
|---|---|---|---|---|
| Water | 37.81 | 37.78 | 27.00 | 27.05 |
| Ethylene Glycol | 32.44 | 32.15 | 35.00 | 35.00 |
| Glycerine | 5.65 | 5.80 | 6.63 | 5.95 |
| Triethanol Amine | 0.11 | — | — | 0.05 |
| Ethomeen C-15 | 0.39 | 0.39 | 0.15 | 0.10 |
| Welan K1A96 | 0.12 | 0.22 | 0.14 | 0.25 |
| PVP K-90 | — | — | 0.88 | 1.40 |
| Kelgin MV | 0.11 | 0.21 | — | — |
| Versene 220 | 0.23 | 0.23 | 0.34 | 0.34 |
| Cobratec 99 | 0.22 | 0.21 | 0.22 | 0.22 |
| Methyl Parasept | 0.06 | 0.05 | 0.07 | 0.07 |
| Ethyl Parasept | 0.07 | 0.07 | 0.08 | 0.08 |
| Kathon PFM | 0.10 | 0.11 | 0.15 | 0.15 |
| Bayer Special Black HF | 22.69 | 22.76 | — | — |
| Violet 204-2 | — | — | 21.86 | 21.86 |
| Blue 204-3 | — | — | 7.48 | 7.48 |
| Shear Thinning Index | 0.67 | 0.62 | 0.71 | 0.61 |
| Viscosity @ 0.3 $S^{-1}$ | 920 | 4,200 | 1500 | 6,20 |
| Viscosity @ 10 $S^{-1}$ | 170 | 450 | 200 | 500 |
| Viscosity @ 100 $S^{-1}$ | 40 | 100 | 50 | 120 |
| Viscosity @ 500 $S^{-1}$ | 20 | 50 | 30 | 60 |

Examples 6–10

The ink formulations in Table III are prepared in accordance with the present disclosure.

TABLE III

| | Ex. 6 | Ex. 7 | Ex. 8 | Ex. 9 | Ex. 10 |
|---|---|---|---|---|---|
| Water | 28.47 | 28.72 | 28.19 | 27.73 | 20.21 |
| Ethyleneglyaol/Propylene Glycol | 32.74 | 34.46 | 33.17 | 32.29 | 36.26 |
| Glycerine | 5.92 | 3.49 | 5.38 | 6.29 | 8.74 |
| Lubriphos LB400 | 0.74 | 0.74 | 0.73 | 0.73 | 0.73 |
| Welan gum-EX 7389 | 0.18 | 0.175 | 0.21 | — | — |
| Kelgin M.V. | 0.20 | 0.205 | — | 0.79 | — |
| PVP K-90 | — | 0.5 | 1.08 | 0.69 | 1.73 |
| Polyox N-10 | — | — | — | — | 0.99 |
| Triethanol Amine | 0.77 | 0.77 | 0.76 | 0.76 | 0.76 |
| Cobratec 99 | 0.20 | 0.22 | 0.22 | 0.22 | 0.22 |
| Versene 220 | 0.34 | 0.34 | 0.34 | 0.34 | 0.33 |
| Methyl Parasept | 0.07 | 0.07 | 0.07 | 0.07 | 0.07 |
| Ethyl Parasept | 0.08 | 0.08 | 0.08 | 0.08 | 0.08 |
| Kathon | 0.12 | 0.12 | 0.12 | 0.17 | 0.15 |
| $KH_2PO_4$ | 0.69 | 0.69 | 0.66 | 0.68 | 0.68 |
| Violet 204-2 | 21.98 | 21.92 | 21.60 | 21.73 | 21.64 |
| Blue 204-3 | 7.50 | 7.50 | 7.39 | 7.43 | 7.41 |
| Shear Thinning Index | 0.63 | 0.62 | 0.65 | 0.85 | 0.95 |

TABLE 4

| | Ex. 11 | Ex. 12 | Ex. 13 | Ex. 14 | Ex. 15 | Ex. 16 |
|---|---|---|---|---|---|---|
| Ethylene Glycol | 37.39 | 38.00 | 38.00 | 38.00 | 50.00 | 45.00 |
| Glycerine | 13.71 | 12.35 | 12.35 | 12.35 | 15.00 | 5.00 |
| PVP K-90 | 2.88 | — | 2.00 | 2.00 | 1.00 | 1.50 |
| Alginate-Kelgin MV | — | 0.40 | — | — | — | — |
| Welan gum K1A96 | 0.07 | 0.09 | 0.09 | 0.09 | 0.10 | 0.10 |
| Water | 17.15 | 20.33 | 17.59 | 17.59 | 3.72 | 13.22 |
| Kathon PFM | 0.14 | 0.15 | 0.10 | 0.10 | 0.10 | 0.10 |
| Atlas G-711 | — | — | — | 0.15 | — | — |
| Eastman EB | — | — | — | — | — | 5.0 |
| Ethomeen C-15 | 0.12 | 0.15 | 0.15 | — | 0.13 | 0.13 |
| Cobratec 99 | 0.21 | 0.20 | 0.22 | 0.22 | 0.20 | 0.20 |
| Versene 220 | 0.30 | 0.50 | 0.30 | 0.30 | 0.30 | 0.30 |
| Methyl Parasept | 0.07 | 0.06 | 0.07 | 0.07 | 0.07 | 0.07 |
| Ethyl Parasept | 0.08 | 0.07 | 0.08 | 0.08 | 0.08 | 0.08 |
| Violet 204-2 | 20.78 | 21.00 | 21.65 | 21.65 | 21.85 | 21.85 |
| Blue 204-3 | 7.11 | 7.00 | 7.40 | 7.40 | 7.45 | 7.45 |
| Total Water | 39.46 | 42.73 | 40.83 | 40.83 | 27.16 | 36.66 |
| Total Solvents | 51.10 | 50.35 | 50.35 | 50.36 | 65.00 | 55.00 |

TABLE 4-continued

|  | Ex. 11 | Ex. 12 | Ex. 13 | Ex. 14 | Ex. 15 | Ex. 16 |
|---|---|---|---|---|---|---|
| % Water in Total Solvents | 43.57 | 45.91 | 44.78 | 44.78 | 29.47 | 39.99 |

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

We claim:

1. An ink composition having a shear index greater than about 0.6 and being heat stable at temperature greater than 100° C., said composition comprising:
   a) at least one shear-thinning polysaccharide selected from the group consisting of welan gum, rhamsan gum and mixtures thereof;
   b) at least one essentially non-shear thinning, water soluble polymeric viscosity modifier;
   c) colorant; and
   d) a solvent containing one or more polar, non-aqueous liquids.

2. The ink composition of claim 1 possessing the following rheological profile:

| Shear Rate (sec$^{-1}$) | Viscosity (cps) |
|---|---|
| 0.01 | Less than about 10,000 |
| 0.1 | Less than about 6,000 |
| 1.0 | Less than about 2,000 |
| 30 | Less than about 200 |
| 2,000 | Less than about 50. |

3. The ink composition of claim 1 wherein the viscosity modifier is selected from the group consisting of alginates, polyalkylene oxide polymers and copolymers, polyvinyl pyrrolidone and mixtures thereof.

4. The ink composition of claim 1 wherein the colorant is a polymeric colorant.

5. The ink composition of claim 1 wherein the shear thinning polysaccharide is present in the composition in an amount which ranges from about 0.05 to about 0.3 weight percent.

6. The ink composition of claim 1 wherein the viscosity modifier is present in the composition in an amount which ranges from about 0.05 to about 0.5 weight percent.

7. The ink composition of claim 1 further comprising a water soluble polymeric binder which becomes water insoluble when the composition is dry.

8. The ink composition of claim 7 wherein the polymeric binder is an amine-modified acrylic copolymer.

9. The ink composition of claim 7 wherein the polymeric binder is present in the composition in an amount up to about 8 weight percent.

10. The ink composition of claim 1 further comprising at least one component selected from the group consisting of pH buffer, surfactant, biocide, anticorrosive agent, sequestering agent and mixtures thereof.

11. The ink composition of claim 10 wherein the solvent includes one or more compounds selected from the group consisting of ethylene glycol, glycerin, benzyl alcohol, and mixtures thereof.

12. The ink composition of claim 1 possessing a shear-thinning index of from about 0.6 to about 0.8.

13. The ink composition of claim 1 possessing the following rheological profile:

| Shear Rate (sec$^{-1}$) | Viscosity (cps) |
|---|---|
| 0.01 | Less than about 5,000 |
| 0.1 | Less than about 3,000 |
| 1.0 | Less than about 2,000 |
| 30 | Less than about 200 |
| 2,000 | Less than about 100. |

14. The ink composition of claim 1 wherein the shear-thinning polysaccharide is welan gum and the viscosity modifier is sodium alginate.

15. The ink composition of claim 1 wherein the shear-thinning polysaccharide is rhamsan gum.

16. An ink composition that is stable at temperatures greater than 100° C. comprising:
   a solvent containing water and at least one polar co-solvent;
   welan gum;
   alginate; and
   a colorant.

17. An ink composition that is stable at temperatures greater than 100° C. comprising:
   a solvent containing water and at least one polar co-solvent;
   rhamsan gum;
   alginate; and
   a colorant.

18. A ball-point pen containing an ink composition having a shear index greater than about 0.6 and being heat stable at temperatures greater than 100° C., said composition comprising:
   a) at least one shear-thinning polysaccharide selected from the group consisting of welan gum, rhamsan gum and mixtures thereof;
   b) at least one essentially non-shear thinning, water soluble polymeric viscosity modifier;
   c) colorant; and
   d) a solvent containing one or more polar, non-aqueous liquids.

19. A ball-point pen containing an ink composition that is stable at temperatures greater than 100° C. comprising:
   a solvent containing water and at least one polar co-solvent;
   welan gum;
   alginate; and a colorant.

20. A ball-point pen containing an ink composition that is stable at temperatures greater than 100° C. comprising:
   a solvent water and at least one polar co-solvent;
   rhamsan gum;
   alginate; and a colorant.

* * * * *